Aug. 24, 1965  E. BRICHARD  3,202,230
METHOD OF AND BALANCE FOR THE PERIODICALLY REPEATED
WEIGHING OF A PREDETERMINED QUANTITY OF MATERIAL
Filed March 12, 1963  4 Sheets-Sheet 1

INVENTOR
EDGARD BRICHARD
BY
Corey, Hart & Stemple
ATTORNEYS

Fig. 2.

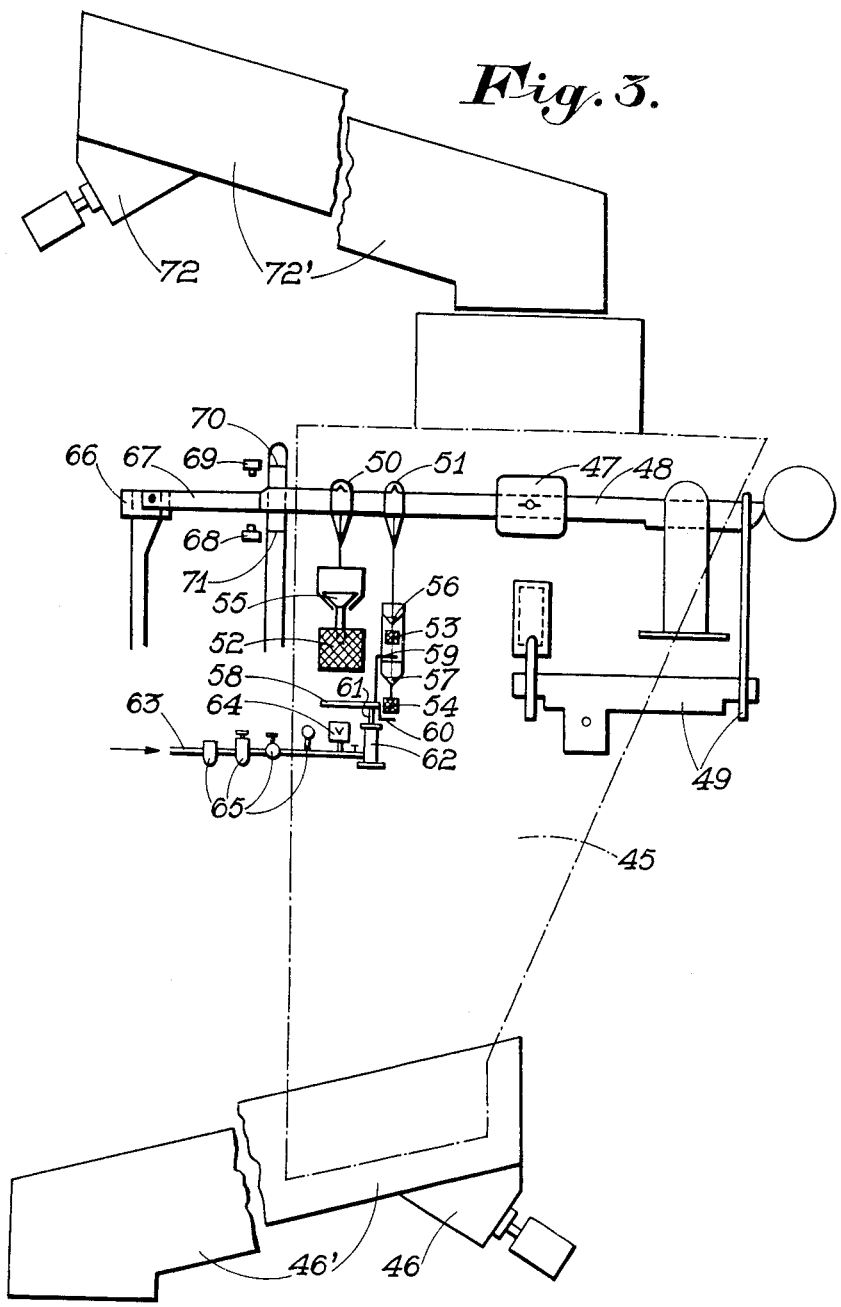

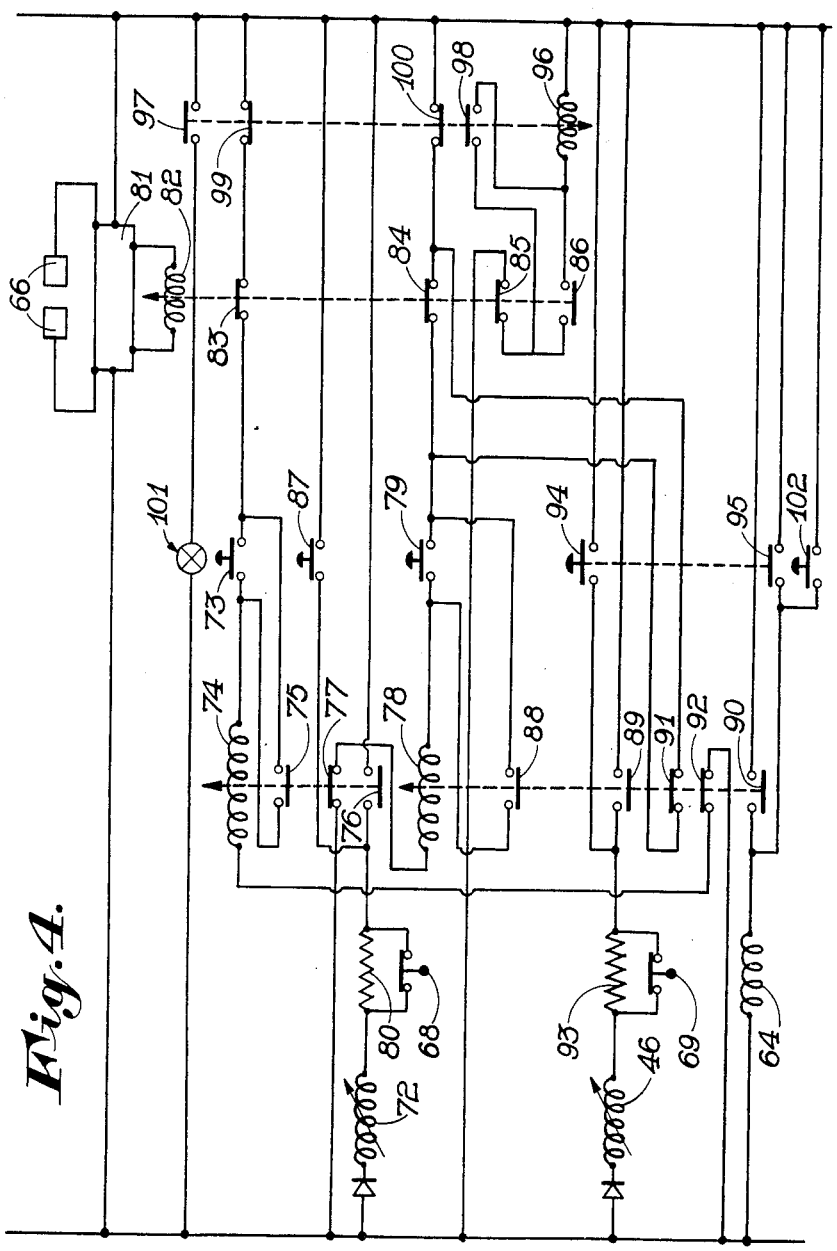

United States Patent Office 3,202,230
Patented Aug. 24, 1965

3,202,230
METHOD OF AND BALANCE FOR THE PERIODICALLY REPEATED WEIGHING OF A PREDETERMINED QUANTITY OF MATERIAL
Edgard Brichard, Jumet, Belgium, assignor to Glaverbel, Brussels, Belgium, a Belgian company
Filed Mar. 12, 1963, Ser. No. 264,534
Claims priority, application Belgium, Apr. 4, 1962, 491,604, Patent 616,002
17 Claims. (Cl. 177—64)

The present invention relates to a process and to an automatic weighing machine for the repeated periodic weighing of a predetermined quantity of material by means of a hopper on a beam-type weighing machine.

It is sometimes necessary frequently to take a constant quantity of a given material. This is especially the case in the batching rooms in the glass industry, where the weight of each batch, for example of sand, must be constant, since this batch is a component of a mixture, the proportions of which must be strictly complied with.

When successively weighing batches comprising the same quantity, several errors can make the result incorrect. The first is due to a human factor; experience has shown that long practice associated with a developed professional conscientiousness is necessary for repeating, without any error, the weight of a constant quantity of materials. The second is due to the kinetic energy of the products being poured into the hopper of the weighing machine. This phenomenon gives an apparent weight, which is the weight read off, always higher than the true weight.

Various beam-type weighing machines are known in which the final speed of loading products into the hopper is reduced in order to eliminate the error of the kinetic energy of the products in motion. This reduction in the speed, occurring when the beam is approaching its position of equilibrium, is combined with a variation of the weight on the beam, making it possible to regulate the quantity of product admitted at reduced speed into the hopper. This variation in the weight on the beam is obtained by a cursor or the counterweight itself being displaced along the beam. Unfortunately, the displacement of a weight along a rod or the beam causes another disadvantage, which is due to the variable friction between a moving element and a fixed element, disposed in a dust-laden atmosphere, as in the case in the batching rooms.

Other ideas are based on the addition of a force to be end of the beam disposed on the side opposite to the weight, relatively to the axis of rotation of the beam. The disadvantage of these embodiments is the sudden removal of the force when the beam approaches a predetermined position close to the point of equilibrium. This sudden release produces oscillations of the beam, which are all the more harmful as they occur at the approach to the point of equilibrium, or at a place where a slight variation in weight causes a large deviation of the beam.

The present invention enables these defects to be eliminated and other advantages will appear more clearly during the following description.

In the process according to the invention, the masses are applied successively and without shock to the beam in a predetermined order and the time during which the beam approaches the point of equilibrium is extended. For the weighing out, the masses of the beam are removed successively and without shock in a predetermined order and the time during which the beam approaches the point of equilibrium when the hopper is emptied is extended.

A weighing machine or balance suitable for carrying out the process and comprising a weighing hopper on a beam loaded with a taring cursor and a plurality of masses, the total of which corresponds to the quantity of material to be weighed, comprises at least one mass which is a relatively reduced part of the total of the masses and acts on the beam automatically before the latter has reached the point of equilibrium. The weighing machine also comprises means for automatically controlling the tare, for automatically controlling the loading of the weighing hopper when the tare is correct, for causing the masses to act automatically on the beam in a predetermined order, for modifying the loading speed according to the loading condition of the hopper and for stopping the loading when the point of equilibrium of the beam is reached.

A weighing machine more particularly suitable for the process by weighing out advantageously also comprises means for controlling the discharge of the weighing hopper loaded with the predetermined quantity of material, for causing the action of the masses on the beam to stop automatically in a predetermined order, comprising the removal of at least a fraction of the masses which are relatively reduced with respect to the total of the masses a little before the beam reaches the taring point of equilibrium, and also means for modifying the unloading speed according to the condition of unloading of the weighing hopper, in order to stop the unloading of the hopper when the discharged quantity corresponds to the predetermined quantity of material, and for actuating an alarm device which becomes operative if the discharged quantity exceeds the predetermined quantity of material.

According to the invention, the weighing machine comprises at least one movable support which is positioned on the trajectory of a fraction of the masses and is intended to support this fraction when the support is displaced upwardly for discharging the said fraction from the beam, and to cause the latter to act on the beam when the support is lowered or when the beam is raised.

The weighing machine preferably comprises several supports fixed at different heights on a movable plate and a means for displacing this plate upwardly so as to discharge all the mass fractions from the beam during the taring of the weighing machine and for displacing the plate downwardly so as to cause the majority of the mass fractions to act on the beam during the arrival of material in the weighing hopper, one or several small fractions starting to act on the beam only when this latter is lifted towards its point of equilibrium. The means for displacing the plate upwardly advantageously comprises a pneumatic or hydraulic jack, the piston of which is fast with the plate, a valve which is opened to give the fluid access to the jack cylinder, an electromechanical control of the valve and a control button for effecting the taring of the weighing machine.

In order that the statement of the invention may be more readily understood, reference numerals have been inserted between parentheses, these numerals relating first of all to an electrical diagram according to FIGURE 2 and later to the electrical diagram according to FIGURE 4 of the accompanying drawings.

The electromechanical control means (16) of the valve is introduced into an electrical circuit comprising a contact (38) actuated by a relay (37) which is capable of being energised by the contact (36) of the control button (29), the effect of voltage being applied to the electromagnetic control means being to open the valve for the purpose of causing the plate to lift and removing the masses from the beam in order to check the taring of the weighing machine. The electrical circuit also comprises a contact (27) actuated by a second relay (24) breaking this contact when it is deenergised, the effect of which is to deenergise the first relay (37) and to open the contact (38) to shut off the supply to the electromagnetic control means (16) of the valve, with a view to permitting the fluid under pressure to flow from the jack cylinder and for the plate to be lowered so as to cause the majority of the fractions of the masses to act on the beam, at least one of the small fractions remaining supported by its support.

The means for automatically controlling the loading of the hopper consists essentially of a vibrator (35) mounted in a supply channel (35'). This vibrator is included in an electric circuit comprising a contact (33) actuated by a third relay (41), breaking this contact when the beam has reached its position of equilibrium.

The means for automatically modifying the loading speed of the hopper comprises an electric resistance (34) which is connected in parallel with a switch (20) in the electric circuit of the vibrator (35). The electric resistance remains dead when the switch is kept closed by the beam lowered on the stop limiting its movement, but when the beam starts to move away from this stop in being lifted, it ceases to actuate the switch which, in opening, causes the current feeding the vibrator to pass through the resistance, this having the effect of reducing the intensity of the action of the vibrator and consequently the feeding speed of the weighing hopper. At the same time, the movement of the beam causes the small fraction of the masses to be detached from its support, or successively the small fractions of the masses to be detached from their respective supports, if there is more than one fraction, and to act on the beam with the purpose of slowing down the movement of the beam and lengthening the time of approach to the point of equilibrium.

The means for stopping the loading when the point of equilibrium of the beam is reached comprises a photoelectric head (18) emitting a light beam capable of being intercepted by the free end of the beam when it is in the position of equilibrium, an amplifier (40) and a relay (41), mentioned above as the third relay, which is energised when the light beam is intercepted and then actuates two normally closed contacts, one of which (33) is capable of breaking the feed circuit of the vibrator (35) and the other (42) of breaking the circuit comprising the energisation of the second relay (24).

The weighting machine suitable for determining the prescribed quantity of material by weighing out comprises in principle the same means as described above for the weighing operation, but certain of these means are somewhat modified because of their combination with the means ensuring the automatic weighing out of the material. In principle, the weighing out operation is only to confirm the result of the weighing operation. In practice, however, this is not the case, because an unforeseeable quantity of material may remain sticking to the walls of the weighing hopper, so that the quantity of material delivered by the hopper is always smaller than the quantity weighed during the filling of the hopper and that only the weighing out enables the predetermined quantity of material to be periodically delivered. In the following, reference will be made to the electrical diagram according to FIGURE 4.

The means for controlling the discharge of the weighing hopper loaded with the predetermined quantity of material comprises a vibrator (46) actuating a discharge channel fast with the weighing hopper. This vibrator is connected into a circuit comprising a contact (89) which is capable of closing the vibrator circuit and is actuated by a relay (78) which also controls a contact (92) which is open when this relay is energised and breaks the supply circuit of another relay (74). The latter in its turn actuates several contacts, of which one (76) is disposed in the circuit of another vibrator (72) actuating the supply channel during the filling of the hopper, and of which another contact (77) is opened when the relay (74) controlling it is energised and interrupts the supply to the first of these relays (78). Thus, each of these two relays, when it is energised, excludes the possibility of the other being energised and while the vibrator (46) actuating the discharge channel of the weighing hopper is operating, the vibrator (72) actuating the supply channel of the weighing hopper, cannot be set in operation, and vice versa.

The means for automatically causing the masses to cease operating on the beam during the discharge of the weighing hopper comprises movable supports which are placed along the path of the fractions of the masses and each adapted to support one of the fractions when the support is displaced upwardly for unloading the beam, and for causing the fractions to act successively on the beam when the supports are lowered. These supports are preferably fixed on a movable plate which is displaced by a means such as that described above. The mass fractions comprise at least one fraction which is relatively small with respect to all the masses and adapted to act on the beam when the beam leaves the lower stop to rise towards the point of equilibrium during the loading of the weighing hopper, and also at least another relatively small fraction adapted to stop acting on the beam when the latter leaves the upper stop to be lowered towards the point of equilibrium during the unloading of the weighing hopper.

The means for automatically modifying the unloading or discharge speed according to the state of emptying of the weighing hopper comprises an electric resistance (93) included in the vibrator circuit (46) in parallel with a switch (69). This latter is held closed by the beam abutting against the upper stop; it is opened when the beam starts to move downwardly towards the point of equilibrium, this causing the current supplying the vibrator (46) to pass by way of the resistance (93), producing the effect of reducing the intensity of the action of the vibrator and the discharging speed of the weighing hopper.

The means for stopping the unloading of the weighing hopper when the discharged quantity corresponds to the predetermined quantity of material and the point of equilibrium of the beam is reached, comprises a photoelectric head (66), an amplifier (81) and a relay (82) which is energised when the free end of the beam intercepts the light beam of the photoelectric head. This relay controls contacts, of which a first contact (83), with the energisation of the relay, interrupts the circuit of the vibrator (72) which is operative during the loading of the weighing hopper, and of which a second contact (84) interrupts the circuit of the vibrator (46) which is operative during the discharging of the hopper.

There is also provided a circuit comprising a delayed-opening contact (91), which is opened when the relay (78) is energised and which maintains the energisation of the said relay (78) during its delay period, when the beam is still in the position of equilibrium at the commencement of an operation and as a result the light beam is intercepted, the relay (82) is energised and the contact (84) is broken.

Finally, the means for actuating the warning device, operative in the event of an incorrect weighing or weighing out, comprises a relay (96) and a contact (86) capable of being actuated, for closing purposes, by the relay (82) at the moment when this latter is energised when the free end of the beam intercepts the light beam of the photoelectric head (66). The closing of this contact applies voltage to the circuit of the relay (96) which, in being energised, closes a delayed-closing contact (97) arranged in the circuit of the warning device (101), as well as a contact (98) for maintaining the energisation of the relay (96), arranged in a circuit comprising the delayed-opening contact (85) and controlled by the relay (82) so as to open when this latter relay is energised. The relay (6) also opens two contacts (99) and (100) when it is energised, the first of these contacts being capable of opening the vibrator circuit (72) which is operative during the loading of the weighing hopper, while the second is capable of opening the vibrator circuit (46), which is operative during the discharging of the weighing hopper. In this way, the contacts of the relay (96) can render operative the warning device and ensure that that one of the vibrators (72) or (46) capable of operating is kept stopped, if the contacts of the relay (82) had become inoperative because of the premature deenergisation of this relay, caused by a continuation of the movement of the free end of the beam beyond the point of equilibrium, which would end the interception of the light beam and the energisation of the relay (82).

Two embodiments of an arrangement according to the invention are shown by way of example in the accompanying drawings, wherein:

FIGURE 2 shows the electrical diagram of the machine according to FIGURE 1.

FIGURE 3 illustrates another weighing machine according to the invention.

FIGURE 4 is the electrical diagram of the machine according to FIGURE 3.

Figure 1:
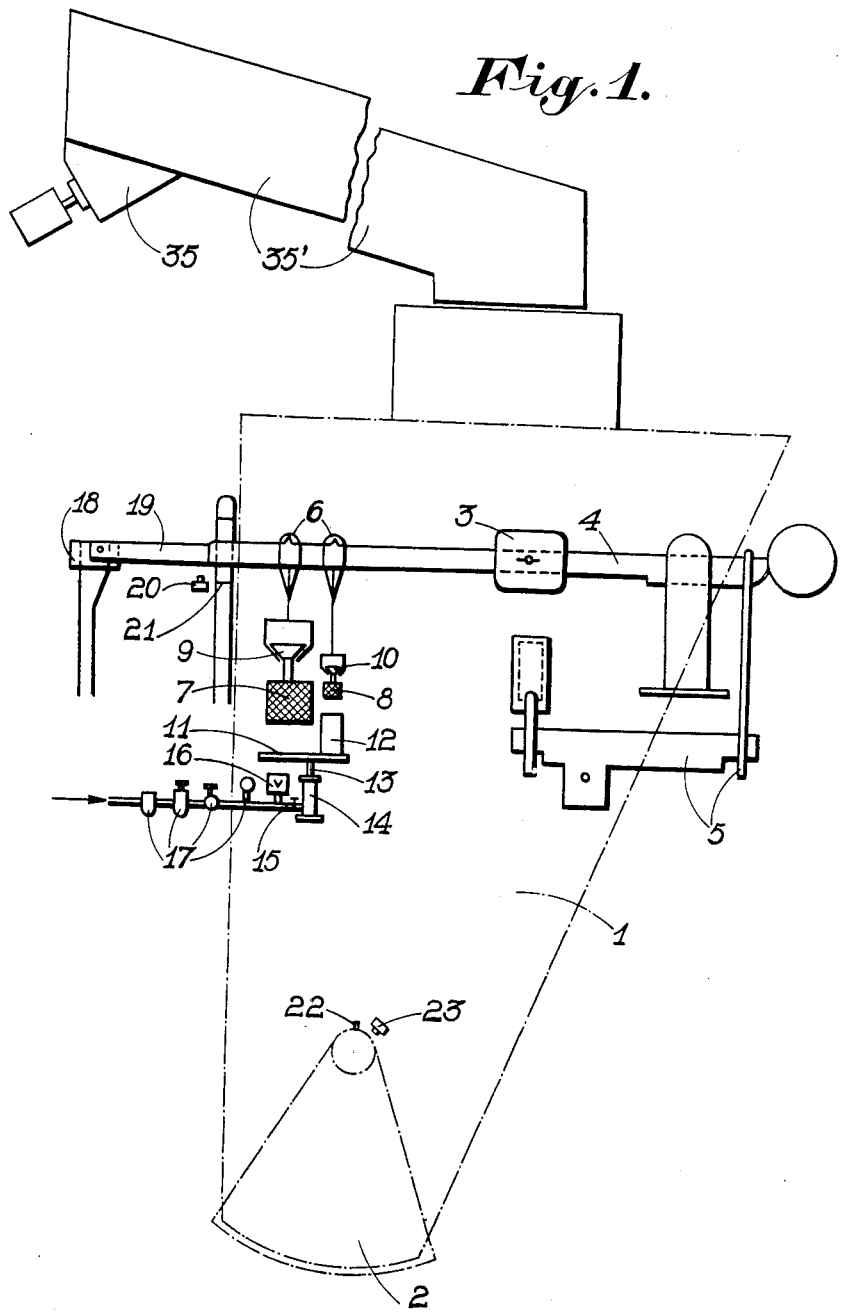
FIGURE 1 is a beam-type weighing machine according to the invention.
Figure 2:
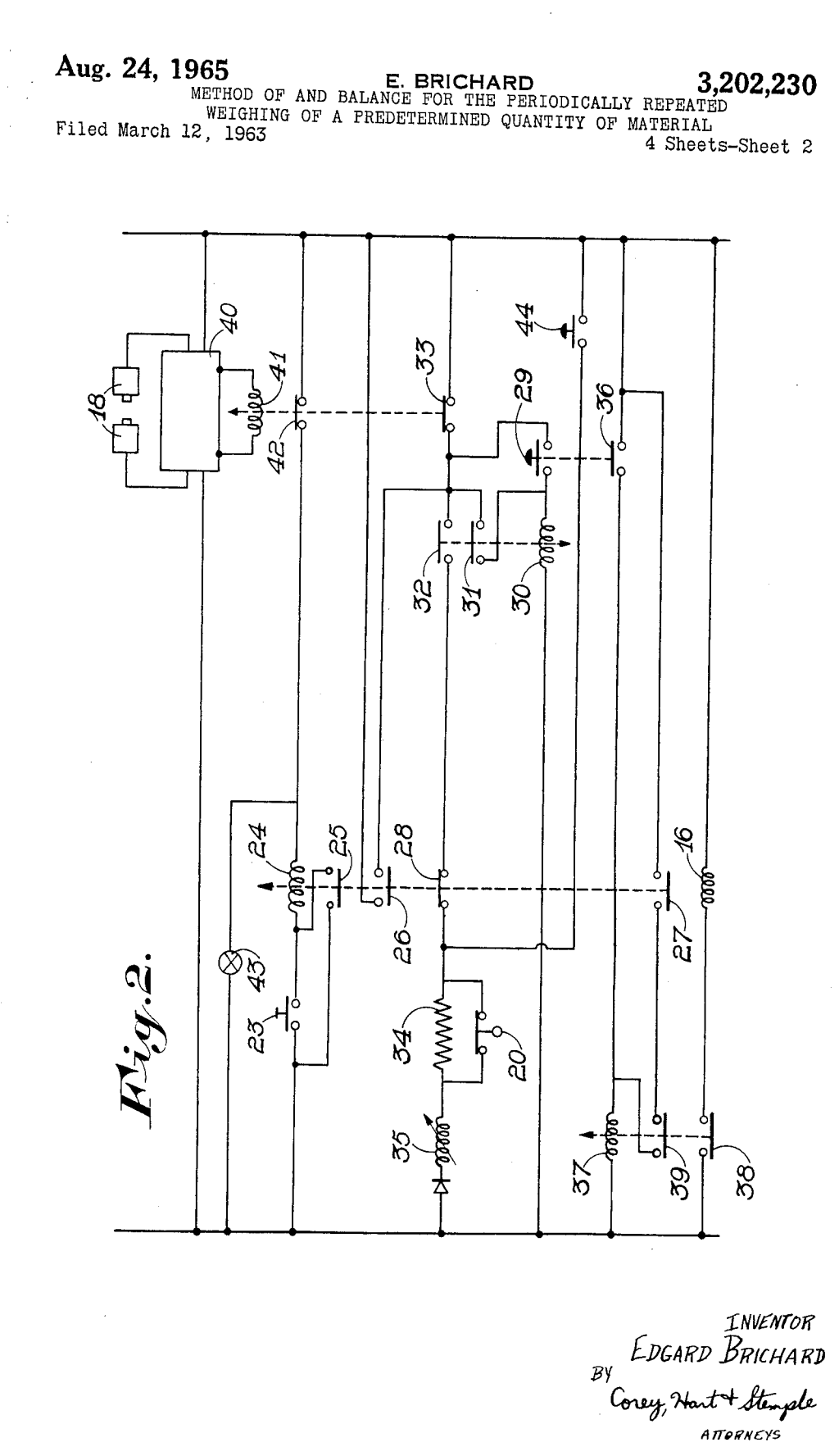

The weighing machine according to FIGURES 1 and 2 comprises a hopper 1, which is closed at its bottom end by a closure member 2. The hopper 1 is balanced by a cursor 3 sliding on the beam 4, to which the load of the hopper 1 is transmitted by a linkage 5. The useful load contained in the hopper is balanced by two cursors 6 carrying weights 7 and 8; the weight 7 is heavier than the weight 8. The weights 7 and 8 are supported by means of conical suspensions 9 and 10. The plate 11 carries a support 12 and is mounted on a rod 13 forming the piston of a cylinder 14. This latter is connected by a pipeline 15 to a compressed air source (not shown). Arranged on this pipeline are a compressed air electromagnetic valve 16 and various accessories 17, such as filters, pressure-reducing valves, pressure gauges. A photoelectric head 18 is centered on the free end 19 of the beam 4 in a horizontal position. A switch 20 is positioned in the path of the beam 4 close to the stop 21, so that the beam resting on the stop actuates the switch. A switch 23 is arranged in the path of a stop 22 fast with the closure member 2.

In order to describe the operation, it is assumed that the hopper 1 is empty and the closure member 2 is still open. The stop 22 operates the switch 23 disposed in the energising circuit of a relay 24 (FIGURE 2), which has for its effect to close the contacts 25, 26, 27 and to open the contact 28. The contact 25 maintains the energisation of the relay 24 when the stop 22 has opened the circuit of the switch 23, which is produced when the closure member 2 has been closed. The pressure on the press button 29 included in the energising circuit of the relay 30 permits the circuit of this relay to be closed, the energisation of which has the effect of closing the contacts 31 and 32. The contact 31 is in a circuit comprising the delay contact 26 (delayed in opening) and maintaining the relay 30 energised. The contact 32 is in a circuit comprising the contact 28, the contact 33 and the resistance 34 arranged in parallel with the control switch 20 for the feed vibrator 35 of the hopper 35′. This feed vibrator circuit is open when the contact 28 is open. The pressure on the press button 29 has also closed the contact 36 in the circuit of a relay 37, the energisation of which causes the closing of contacts 38 and 39. The contact 38 is in the circuit of the electromagnetic valve 16 controlling the supply of compressed air to the cylinder 14 and the contact 39 maintains the relay 37 energised, the contact 27 being closed. With the electromagnetic valve 16 open, the plate 11 fast with the piston 13 is lifted and acts on the weights 7 and 8. The beam 4 is placed in the position of equilibrium if the taring of the machine is correctly effected by means of the cursor 3.

In the position of equilibrium, the free end 19 of the beam intercepts the light beam from the photoelectric head 18. By means of an amplifier 40, the photoelectric head 18 controls a relay 41 when the light beam is interrupted, the energisation of said relay opening the relay contact 42 (delayed-closure) and the contact 33. The contact 42 is in the circuit of a signal lamp 43, which goes out when the beam is in the position of equilibrium. The opening of the contact 42 interrupts the energisation of the relay 24 and the contacts 25, 26 and 27 are opened, while the contact 28 is closed. The opening of the contact 27 breaks the circuit of the relay 37, which opens the contact 38, this deenergising the electromagnetic valve 16. The plate 11 is lowered and the weight 7 loads the beam 4, which is lowered. The taring period is thus completed.

The closing of the contact 28 in the circuit of the contacts 32 and 33 closes the circuit of the feed vibrator 35. As long as the beam 4 is in the lowered position, the switch 20 is closed, this placing the resistance 34 out of circuit. As soon as the beam 4 leaves its lowered position, it opens the switch 20, which brings the resistance 34 into the circuit, thus reducing the vibration frequency of the feed vibrator 35. At this moment, the beam takes effect on the weight 8. When the balance of the beam 4 is reached, the free end of the beam 19 intercepts the light beam from the photoelectric head 18, this causing the energisation of the relay 41 and consequently the opening of the contacts 42 and 33. The opening of the contact 33 opens the energising circuit of the feed vibrator 33 and of the relay 30.

The emptying is carried out manually by opening the closure member 2. The rotation of the stop 22 closes the circuit of the switch 23. However, the relay 24 is not energised, since the contact 42 is open. As soon as the emptying operation is started the free end 19 of the beam 4 leaves the photoelectric head 18, and this causes the deenergisation of the relay 41 and the closing of the contacts 42 and 43 by means of the amplifier 40.

The pressure on the manual press button 44 in the vibrator circuit 35 enables the latter circuit 35 to be closed for manual refilling.

The embodiment according to FIGURES 3 and 4 shows an arrangement similar to that which has just been described, but which permits the automatic control of the weighing and the weighing out.

The machine comprises a hopper 45, closed by an emptying channel or duct 46′ with a vibrator 46. The hopper 45 and the emptying duct 46′ are balanced by a cursor 47 sliding on the beam 48, to which the load is transmitted by a linkage 49. The useful load contained in the hopper is balanced by two cursors 50 and 51 carrying weights 52, 53 and 54, the weight 52 being larger than the weights 53 and 54. These weights are supported by means of conical suspensions 55, 56 and 57. The plate 58 comprises two supports 59 and 60 and a rod 61 forming the piston of a cylinder 62 connected by a pipeline 63 to a compressed air source (not shown). Arranged along this pipeline are a compressed air electromagnetic valve 64 and various accessories 65, such as filters, pressure-reduction valves, pressure gauges. A photoelectric head 66 is centered horizontally on the free end 67 of the beam 48. Two switches 68 and 69 are arranged in the path of the beam 48 close to beam stops 70 and 71, so that contact of the beam with a stop actuates the corresponding switch.

In order to describe the operation, it is assumed that the hopper is empty. The beam 48 is in the lowered position and closes the circuit of the switch 68 which is in the circuit of the feed vibrator 72 and the automatic refilling press button 73. The weights 52 and 53 are connected to the beam 48, but the weight 54 remains positioned on the support 60. Pressure on the automatic refilling press button 73 closes the circuit of the vibrator 72 of the feed channel 72' by means of the switch 68. The closing of automatic refilling press button 73 closes the energising circuit of the relay 74, the energisation of which closes the contacts 75 and 76 and opens the contact 77. The energising circuit of the relay 74 is thus held by the contact 75 and it is possible to release the aforesaid press button 73. The contact 76 closes the circuit of the feed vibrator 72 by means of the switch 68. The opening of the contact 77 in the energising circuit of the relay 78 prevents the energisation of the latter. With the filling operation, the beam 48 is lifted, opens the contacts of the switch 68, this connecting a resistance 80 in series with the circuit of the feed vibrator 72. Simultaneously, the beam 48 is loaded by the weight 54. With the arrival at the position of equilibrium of the free end of the beam 67, the lighting circuit of the photoelectric head 66 is broken and the relay 82 is energised by means of the amplifier 81. The energising of the relay 82 has the effect of opening the contacts 83, 84 as well as the delayed-opening contact 85 and of closing the contact 86. The effect of opening the contact 83 is to open the energising circuit of the relay 74, the deenergisation of which causes the opening of the contact 76 which, being in the circuit of the feed vibrator 72, opens the circuit; the filling of the hopper 45 ceases.

The pressure on the press button 87 for manual filling closes the circuit of the filling vibrator 72 in the case of manual filling.

By actuating the press button 79 for automatic emptying arranged in the circuit of the relay 78, the latter is energised, this having the effect of closing the contacts 88, 89 and the contact 90 which is delayed in relation to the deenergisation of the relay and of opening the contact 91 delayed with respect to the energisation of the relay and the contact 92. The closing of the contact 88 maintains the current in the circuit of the relay 78. The closing of the contact 90 in the circuit of the electromagnetic valve 64 closes the circuit of this latter.

The effect of closing the electromagnetic valve 64 is to admit compressed air into the cylinder 62 and thus to lift the rod 61, the plate 58 and the supports 59 and 60. The plate 58 lifts the weight 52 and the support 60 lifts the weight 54, the weight 53 remaining connected to the beam. The unloaded beam rises against the stop 70 and closes the contact of the switch 69 in the vibrator circuit 46 of the emptying duct 46'. At the instant when the beam starts rising towards the stop 70, the free end 67 of the beam intercepts the light beam from the photoelecric head 66, and this has the effect of energising the relay 82 and of opening the contact 84 to break the direct supply to the relay 78. The energisation of this relay is however assured by the circuit of the delay contact 91 during the period of the delay of this contact. The delay period is sufficient in order that, before completion of the latter, the free end of the beam, in rising, has been able to stop intercepting the light beam of the photoelectric head, with the consequence that the relay 82 is deenergised and the direct circuit of the relay 78 is reestablished by the closing of the contact 84.

When the balance beam leaves the stop 70 because of the advance of the unloading of the hopper, it opens the circuit of the switch 69, and this has the effect of connecting the resistance 93 into the circuit of the vibrator 46 of the emptying duct 46'. Simultaneously, the beam 48 unloads the weight 53 on its support 59. When the free end of the beam 67 reaches the photoelectric head 66, the relay 82 is energised as previously described. The opening of the contact 84 interrupts the energisation of the relay 78, and the deenergisation of the latter opens the contact 89 in the feed circuit of the vibrator 46 and the emptying operation is stopped. The deenergisation of the relays 78 opens the contact 90 which is in the circuit of the electromagnetic valve 64. The plate 58 with the two supports 59 and 60 moves downwardly again and the position has resumed that initially obtained, that is to say, the weights 52 and 53 act on the beam and the weight 54 remains positioned on the support, the machine being ready for a fresh operation of weighing and weighing out.

In order to effect the emptying by hand, the manual emptying press button 94 closing the circuit of the emptying duct 46 is pressed. Simultaneously, the contact 95 closes the circuit of the electromagnetic valve 64. As previously described, the closing of the circuit of the electromagnetic valve 64 causes the lifting of the plate 58 and of the supports 59 and 60 in order to take over the weights 52 and 54.

A warning device enables it to be ensured that the free end of the beam 67 does not exceed the position of equilibrium. The relay 96 in the circuit of the contact 86 is energised when the contact 86 is closed, and as stated above, this occurs when the free end 67 of the beam is in the position of equilibrium. The energisation of the relay 96 causes the closing of the delayed-closure contact 97, the closing of the contact 98 and the opening of the contacts 99 and 100. If the free end of the beam remains in the photo-electric head 66, the relay 82 is energised and the contact 85 opened, as described above. The opening of the contact 85 opens the circuit of the relay 96. In the position of equilibrium of the beam, the contact 97 does not have time to act on the warning circuit 101. On the contrary, if the free end 67 of the beam passes beyond the photoelectric head 66, the relay 82 is deenergised and the contact 85 is closed, also as described above. After the delay period, the delay contact 97 closes the circuit of the warning signal 101. The opening of the contact 99 when the relay 96 is energised opens the circuit of the relay 74 and prevents the filling operation. The opening of the contact 100 when the relay 96 is energised opens the circuit of the relay 78 and prevents the emptying.

The warning arrangement 101 may comprise light or acoustic signals, and also a trip device capable of interrupting the supply of the electric circuits with a view to blocking the weighing machine.

In order to carry out the manual control of the tare, the press button 102 is actuated, this closing the circuit of the electromagnetic valve 64. As already stated above, the plate 58 and the supports 59 and 60 then take over the weights 52, 53 and 54.

It is obvious that the invention is not limited to the embodiments which have been described and illustrated by way of example, and it would not represent a departure from the scope thereof by incorporating modifications.

I claim:

1. A weighing machine comprising a weighing hopper, a beam connected to said hopper and having a taring cursor balancing said hopper, a plurality of masses having a total weight corresponding to the quantity of material to be weighed, means enabling said beam to carry said masses in depending relation thereon and enabling vertical movement of said masses to load and unload said beam, means operative to raise the masses in said carrying means to remove the weight thereof from said beam to check the tare of the machine, means controlled by said beam when the tare is correct for loading said weighing hopper and for progressively loading said masses on said beam in predetermined order, said hopper loading means including a material supply channel connected to said hopper and a first vibrator for such channel, and means for controlling the discharge of said hopper loaded with a given weight of material comprising a discharge channel connected to said hopper, a second vibrator connected to said discharge channel, a circuit including said first and second vibrators, a first relay and associated contact controlling the operation of said first vibrator, a second relay and associated contact controlling the operation of said second vibrator, and a contact common to said first and second relays and operable to render one of said relays inoperative to actuate its associated vibrator when the other of said relays is conditioned to operate its associated vibrator.

2. A weighing machine according to claim 1, in which the means for controlling the discharge of said hopper includes means for modifying the rate of unloading the material from the hopper and comprises an electric resistance included in the circuit of said second vibrator in parallel with a limit switch arranged to be closed by said beam at the uppermost position of its range of movement, said limit switch opening when the beam starts to move downwardly toward its point of equilibrium to cause the current supplying said second vibrator to pass through said resistance, thereby reducing the intensity of the vibrator and the discharging speed of the weighing hopper.

3. A weighing machine according to claim 1, in which said means for controlling the discharge of said hopper includes means for stopping the unloading of the hopper when the discharged quantity corresponds to a given weight of material and the point of equilibrium is reached and comprises in said circuit a photoelectric means controlled by said beam, an amplifier and a relay connected to said photoelectric means, and a pair of contacts controlled by said relay, one of said contacts controlling the circuit of said first vibrator and the other of said contacts controlling the circuit of said second vibrator.

4. A weighing machine according to claim 3, in which said circuit includes a delay-opening contact which is opened when said second relay associated with said second vibrator is energized and which maintains the energization of said second relay during the delay period thereof while the beam is still in the position of equilibrium at the commencement of an operation in which it is intercepting the light beam of said photoelectric means.

5. A weighing device according to claim 3, in which said circuit includes means operative in the event of an incorrect weighing or weighing out and comprising a warning relay (96) and associated contact (85) actuated by said photoelectric means relay (82) when the latter is energized by the free end of said beam intercepting the light beam of said photoelectric means, a delay closing contact (97) controlled by said warning relay (96), a warning device (101) controlled by said contact (97), and a pair of contacts (99) and (100) controlled by said warning relay (96), said contact (99) controlling said first vibrator and said contact (100) controlling said second vibrator and rendering both said vibrators inoperative when actuated by said warning relay (96) in the event said relay (82) is prematurely deenergized by the beam passing through its point of equilibrium.

6. A weighing machine comprising a weighing hopper, a beam connected to said hopper and having a taring cursor balancing said hopper, a plurality of masses having a total weight corresponding to the quantity of material to be weighed and certain of which each constitute a small fraction of such total weight, means supporting said masses in depending relation on said beam and enabling movement of said masses vertically to load and unload said beam, means automatically operative to remove the weight of said masses from said beam to check the tare of the machine, means controlled by said beam when the tare is correct for loading said weighing hopper and for loading said masses on said beam in predetermined order, means for modifying the loading speed of said masses according to the loading condition of said hopper, and means for stopping the loading of the hopper when the beam reaches the point of equilibrium, said machine including a movable plate having several supports fixed thereon and located at different heights from such plate, said plate and supports thereon being positioned in the paths of movement of said masses and supporting the latter when said plate is moved upwardly, means for moving said plate upwardly to unload said masses from the beam during the taring of the machine, and for moving said plate downwardly to cause said masses to act on the beam as the hopper is being loaded, said supports being located relative to said plate that at least one of said supports loads a fractional mass on said beam only when the latter is reaching its point of equilibrium under the weight in said hopper, said plate moving means including a jack having a piston supporting said plate, a valve controlling the fluid to said jack, an electric circuit comprising electromechanical control means for said valve, a first contact (38) controlling said circuit, and a first relay (37) for actuating said first contact, said automatic unloading means comprising a second contact (36) controlling said relay, and a control button (29) operable to actuate said second contact (36) to energize said relay (37) and cause the jack to operate to lift said plate and thereby remove the masses from said beam, and said controlled means comprising in said circuit a third circuit controlling contact (27), a second relay (24) for actuating said third contact, and means for actuating said second relay (24) to cause said third contact (27) to be operated to actuate said first relay (37) and first contact (38) to cause said jack to operate to lower said plate to the extent that all, but at least one of said small fractions of such masses, are loaded on said beam.

7. A weighing machine comprising a weighing hopper, a beam connected to said hopper and having a taring cursor balancing said hopper, a plurality of masses having a total weight corresponding to the quantity of material to be weighed, means enabling said beam to carry said masses in depending relation thereon and enabling vertical movement of said masses to load and unload said beam, means operative to raise the masses in said carrying means to remove the weight thereof from said beam to check the tare of the machine, means controlled by said beam when the tare is correct for loading said weighing hopper and for progressively loading said masses on said beam in predetermined order, means for discharging said hopper when it is loaded with a given weight of material, and means for causing the masses to cease operating on said beam during the discharge of said hopper including a movable support for each of said masses located in the path of vertical movement of such mass and movable in such path to come into engagement with and to support such mass when such support is moved upwardly to unload the beam, said supports having different vertical positions relative to each other and such that they are caused to act successively on the beam when such supports are lowered, means for moving said supports vertically through a given range of movement to load and unload said beam, the masses associated with said supports including at least one mass which is relatively small with respect to all the masses and caused by an associated support to act on the beam when the beam starts to rise from a lowermost position toward the point of equilibrium during the loading of the weighing hopper, and at least another mass of a relatively small fraction of the total weight of the masses caused by an associated support to stop acting on the beam when the latter starts to lower from an uppermost position towards the point of equilibrium during the unloading of the hopper.

8. A weighing machine comprising a beam-type weighing machine having a hopper and a taring cursor for balancing the weight of such hopper, means for supporting in depending relation on the beam of said machine a plurality of masses, each of which has a weight which is a given fraction of the total weight of a predetermined quantity of material weighed in said hopper, one of said masses having a weight constituting a relatively large fraction of said total weight and another of said masses having a weight constituting a relatively small fraction of said total weight, and all of such masses employed either for weighing or weighing out having a composite weight equal to such total weight, and means for supporting said masses so that their weights are removably mounted on said beam, and being operable while the predetermined quantity of material is being supplied to or removed from said hopper to load or unload said masses successively and without shock to the beam in a given order, said supporting means being constructed and arranged to initially load said one mass on said beam in a weighing operation to bring the beam to a lowered position, and then to load said other mass on said beam when the latter during its rising movement toward its point of equilibrium reaches a position below said point of equilibrium.

9. A weighing machine comprising a beam-type weighing machine having a hopper and a taring cursor for balancing the weight of such hopper, means for supporting in depending relation on the beam of said machine a plurality of masses, each of which has a weight which is a given fraction of the total weight of a predetermined quantity of material weighed in said hopper, and all of such masses employed either for weighing or weighing out having a composite weight equal to such total weight, and means for supporting said masses so that their weights are removably mounted on said beam, and being operable while the predetermined quantity of material is being supplied to or removed from said hopper to load or unload said masses successively and without shock to the beam in a given order, said supporting means comprising a support for each mass located below such mass, said supports being fixed with relation to each other and located on different horizontal levels, actuatable means for raising and lowering said supports as a unit to provide successive unloading and loading of said masses, and means operable to operate said actuatable means to move said supports while the material is being supplied to or removed from said hopper.

10. A weighing machine according to claim 9, in which said operable means includes means controlled by said beam for controlling the operation of said actuatable means.

11. A weighing machine according to claim 9, in which said operable means includes means for initiating operation of said actuatable means to cause the latter to raise said supports to progressively unload said beam, and means controlled by said beam and operable when such beam reaches a point of equilibrium for causing operation of said actuatable means to lower said supports to progressively load said beam.

12. A weighing machine according to claim 11, including means for feeding the material to said hopper, and second controlled means controlled by said beam controlled means for controlling the operation of said feeding means.

13. A weighing machine according to claim 12, in which one of said masses has a weight constituting a relatively large fraction of said total weight and another of said masses has a weight constituting a relatively small fraction of said total weight, in which said supports are constructed and arranged to initially load said one mass on said beam when said actuatable means is operated to lower said supports, and including means to vary the operation of said feeding means after said one mass has been loaded on said beam and the beam is rising toward its point of equilibrium.

14. A weighing machine according to claim 9, in which said operable means includes means controlled by said beam and operable when said beam reaches a given point in its range of movement to cause operation of said actuatable means to move said supports so as to progressively load or unload said beam.

15. A weighing machine according to claim 14, including means for discharging the material from said hopper, and means controlled by said beam and operable when said beam reaches the upper end of its range of movement to initiate the operation of said discharging means.

16. A weighing machine according to claim 14, including means for rendering said operable means incapable of operating said actuatable means as said beam is moving upwardly through its point of equilibrium in a weighing out operation.

17. A weighing machine comprising a beam-type weighing machine having a hopper and a taring cursor for balancing the weight of such hopper, means for supporting in depending relation on the beam of said machine a plurality of masses, each of which has a weight which is a given fraction of the total weight of a predetermined quantity of material weighed in said hopper, one of said masses having a weight constituting a relatively large fraction of said total weight and another of said masses having a weight constituting a relatively small fraction of said total weight, and all of such masses employed either for weighing or weighing out having a composite weight equal to such total weight, and means for supporting said masses so that their weights are removably mounted on said beam, and being operable while the predetermined quantity of material is being supplied to or removed from said hopper to load or unload said masses successively and without shock to the beam in a given order, said supporting means being constructed and arranged to initially load said one mass on said beam in a weighing operation to bring the beam to a lowered position, and then to load said other mass on said beam when the latter during its rising movement toward its point of equilibrium reaches a position below said point of equilibrium, said masses including a third mass having a weight constituting a relatively small fraction of said total weight, and said supporting means being constructed and arranged to initially unload said one mass on said beam in a weighing out operation to cause said beam to rise above its point of equilibrium, and then to unload said third mass from said beam as the latter falls to a position above its point of equilibrium.

References Cited by the Examiner

UNITED STATES PATENTS

| | | | |
|---|---|---|---|
| 6,174 | 3/49 | Eastman | 177—248 |
| 605,127 | 6/98 | Olin | 177—237 |
| 1,198,651 | 9/16 | Osgood | 177—248 |
| 1,440,204 | 12/22 | Alschuler | 214—152 |
| 1,519,685 | 12/24 | Johnson | 177—70 |
| 2,022,659 | 12/35 | Fisher et al. | 177—45 X |
| 2,197,514 | 4/40 | Barnes | 250—231 |
| 2,249,124 | 7/41 | Frye | 177—248 X |
| 2,273,330 | 2/42 | Robinson | 222—55 |
| 2,701,703 | 2/55 | Evers | 177—115 X |
| 2,705,607 | 4/55 | Inglett | 177—1 |
| 2,720,375 | 10/55 | Carter | 177—1 |
| 2,976,006 | 3/61 | Stambera | 177—81 |

LEO SMILOW, *Primary Examiner.*

LEYLAND M. MARTIN, *Examiner.*